United States Patent
Ben-Yoseph et al.

(10) Patent No.: US 6,893,671 B2
(45) Date of Patent: May 17, 2005

(54) CHOCOLATE CONFECTIONERY HAVING HIGH RESOLUTION PRINTED IMAGES ON AN EDIBLE IMAGE-SUBSTRATE COATING

(75) Inventors: Eyal M. Ben-Yoseph, Stroudsburg, PA (US); Thomas M. Collins, Nazareth, PA (US); Arun V. Shastry, Neshanic Station, NJ (US); Neil A. Willcocks, Flanders, NJ (US); Suresh S. Narine, Edmonton (CA); James M. Suttle, East Stroudsburg, PA (US)

(73) Assignee: Mars, Incorporated, McLean, VA (US)

( * ) Notice: Subject to any disclaimer, the term of this patent is extended or adjusted under 35 U.S.C. 154(b) by 152 days.

(21) Appl. No.: 09/738,671

(22) Filed: Dec. 15, 2000

(65) Prior Publication Data

US 2002/0114878 A1 Aug. 22, 2002

(51) Int. Cl.⁷ .................................................. A23G 1/00
(52) U.S. Cl. ...................... 426/87; 426/104; 426/383; 426/249
(58) Field of Search .................... 426/87, 383, 104, 426/249, 93, 302

(56) References Cited

U.S. PATENT DOCUMENTS

| | | |
|---|---|---|
| 2,895,832 A | 7/1959 | Bersey |
| 3,052,552 A | 9/1962 | Koerner et al. ............... 99/148 |
| 3,390,049 A * | 6/1968 | Reduick et al. ............. 424/481 |

(Continued)

FOREIGN PATENT DOCUMENTS

| | | | |
|---|---|---|---|
| EP | 0321188 | 6/1989 | |
| EP | 0705890 | 4/1996 | |
| EP | 739957 | * 10/1996 | ................. 426/383 |
| FR | 2751451 | 1/1998 | |
| GB | 838948 | 6/1960 | |
| GB | 2074947 | 11/1981 | |
| GB | 2191117 | * 12/1987 | ................. 426/383 |
| GB | 2205024 | 11/1988 | |
| GB | 2321213 | * 7/1998 | ................. 426/383 |
| JP | 62-074244 | * 4/1987 | ................. 426/383 |
| JP | 2-60551 | * 3/1990 | ................. 426/383 |
| JP | 2-60552 | * 3/1990 | ................. 426/383 |
| WO | 91/01649 | 2/1991 | |
| WO | 97/16075 | 5/1997 | |
| WO | WO9717409 | * 5/1997 | ................. 426/383 |
| WO | 00/56165 | 9/2000 | |
| WO | 057717 | 10/2000 | |

OTHER PUBLICATIONS

Swiss Colony, Christmas Gift Book, Copy, 1426/104, 1982.*

*Primary Examiner*—Steven L. Weinstein
(74) *Attorney, Agent, or Firm*—Fitzpatrick, Cella, Harper & Scinto

(57) ABSTRACT

A chocolate confectionery is disclosed having on a surface thereof a chocolate base layer, a non-delaminating integral substantially white or light colored edible image-substrate coating disposed on at least a portion of a surface of the chocolate base layer and a high resolution edible black and/or colored print image disposed on at least a portion of the edible image-substrate coating. A method is also disclosed for preparing the confectionery.

36 Claims, 2 Drawing Sheets

U.S. PATENT DOCUMENTS

| | | | | |
|---|---|---|---|---|
| 3,438,797 A | * | 4/1969 | Biddle | 427/2.2 |
| 3,463,645 A | * | 8/1969 | Kane | 427/2.23 |
| 3,533,804 A | * | 10/1970 | Bennett | 426/87 |
| 3,738,952 A | * | 6/1973 | Signorino | 524/77 |
| 4,168,321 A | * | 9/1979 | Okamoto | 426/249 |
| 4,168,662 A | * | 9/1979 | Fell | 426/383 |
| 4,382,968 A | * | 5/1983 | Akutagawa | 426/249 |
| 4,531,292 A | | 7/1985 | Pasternak | 33/18 R |
| 4,578,273 A | | 3/1986 | Krubert | 426/87 |
| 4,778,683 A | * | 10/1988 | Newsteder | 426/87 |
| 4,910,661 A | | 3/1990 | Barth et al. | 364/167.01 |
| 4,946,696 A | * | 8/1990 | Nendl et al. | 426/87 |
| 5,006,362 A | | 4/1991 | Hilborn | 427/3 |
| 5,017,394 A | | 5/1991 | Macpherson et al. | |
| 5,258,187 A | | 11/1993 | Shimada | |
| 5,407,691 A | * | 4/1995 | Przelomski | 426/383 |
| 5,435,840 A | | 7/1995 | Hilborn | 106/20 R |
| 5,505,775 A | | 4/1996 | Kitos | 118/14 |
| 5,534,281 A | | 7/1996 | Pappas et al. | 426/383 |
| 5,702,740 A | * | 12/1997 | Wild | 426/87 |
| 5,741,505 A | * | 4/1998 | Beyer et al. | 424/439 |
| 5,800,601 A | | 9/1998 | Zou et al. | 106/31.65 |
| 5,834,047 A | | 11/1998 | Ahn | 426/383 |
| 6,030,134 A | | 2/2000 | Stewart | |
| 6,058,843 A | | 5/2000 | Young | 101/483 |
| 6,230,073 B1 | * | 5/2001 | Kofman et al. | 426/87 |

* cited by examiner

US 6,893,671 B2

CHOCOLATE CONFECTIONERY HAVING HIGH RESOLUTION PRINTED IMAGES ON AN EDIBLE IMAGE-SUBSTRATE COATING

BACKGROUND OF THE INVENTION

1. Field of the Invention

This invention is directed to a chocolate confectionery having a black or colored high resolution edible image deposited on an image-substrate coating that is dispersed on a surface of the chocolate confectionery. Preferably, the chocolate is milk or dark chocolate and the image-substrate coating is substantially white or light colored, which provides for excellent image contrast when edible high resolution images are printed thereon using edible inks applied by ink jet printing.

2. Related Background Art

It is known to form highly detailed images on milk and dark chocolates using pad printing with a white ink. However, the formation of high resolution colored images on milk and dark chocolate has been difficult due in part to the lack of contrast between the chocolate and the colored food dyes. Attempts to avoid this problem have included printing colored images on white chocolate. However, the typical dull white of white chocolate does not provide a very good contrast background for printing high resolution black or colored images. In addition, when you print directly on the chocolate surface the image tends to be prone to smearing and the image resolution is poor. Moreover, milk chocolate and dark chocolate have a much greater presence in the market place.

Frosting sheets have been used in the cake industry to provide a means of placing an ink jet printed color image on a cake. The frosting sheet is printed and then either placed on or bound to the top of the cake. There has, however, been no suggestion of printing on chocolate confectionery.

Groovychocolate.com sells a chocolate bar with a colored printed image on a relatively thick layer of hard white icing disposed in a shallow recess of the chocolate bar. The layer of icing is approximately 1.25 mm thick. Thus, the resulting substrate on which the colored image is printed is a separate layer which is quite noticeable, particularly when bitten by a person eating the chocolate bar.

A chocolate having a high resolution colored image on a non-delaminating integral edible image-substrate, particularly one prepared by ink jet printing with edible dyes, and providing excellent eating quality, i.e., the substrate does not substantially alter the taste and texture of the chocolate, would be highly desirable.

SUMMARY OF THE INVENTION

This invention is directed to a chocolate confectionery having a high resolution edible printed image on a surface of the chocolate. In particular, the chocolate confectionery comprises a non-delaminating integral edible image-substrate coating disposed on at least a portion of the surface of a chocolate base layer and a printed image formed by the deposition of at least one of an edible black or color ink on at least a portion of the image-substrate coating. The image-substrate coating is substantially white or light colored which provides an excellent background for printing with colored or black edible inks. Moreover, the image substrate coating does not substantially alter the taste and texture of the chocolate base layer. Most preferably, the chocolate base layer is milk or dark chocolate. It is preferable to print the image on the image-substrate coating using an ink jet printing method.

Yet another embodiment of this invention is directed to a method of preparing the chocolate confectionery having a high resolution printed image disposed on an edible image-substrate coating residing on the surface of the chocolate.

DETAILED DESCRIPTION OF THE INVENTION

Figure 1:
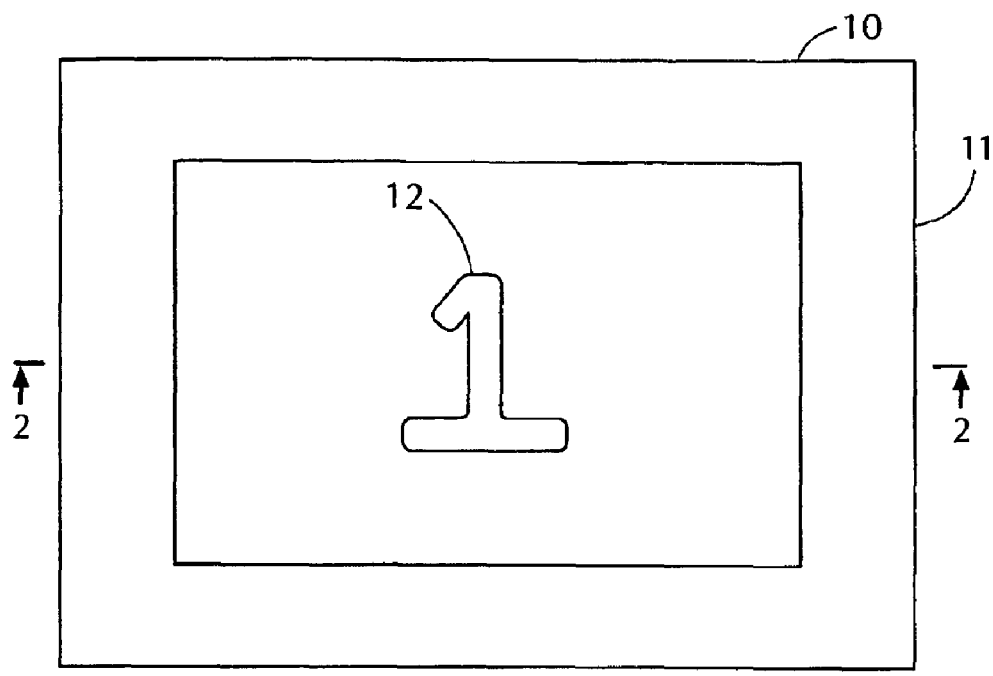
FIG. 1 is a top view of a chocolate confectionery of this invention.

FIG. 1 illustrates a milk or dark chocolate confectionery of this invention having a milk or dark chocolate base layer 10 with an edible image-substrate coating 11 disposed on a portion of the top surface of the chocolate base layer. An edible black or color ink is disposed on a portion of the edible image-substrate coating to form the image of a numeral one 12. The image formed on the image-substrate may be any of one or more graphical representations, including text and/or photo images.

The chocolate base layer may be milk chocolate, dark chocolate or white chocolate. Milk or dark chocolate are particularly preferred. The milk or dark chocolate base layer is generally standard of identity (SOI) chocolate, but also includes any non-SOI chocolate that mimics the look of SOI milk chocolate or dark chocolate. The preparation of both SOI and non-SOI chocolate is well known to those skilled in the art. The chocolate base layer can take any shape or form that provides a surface upon which both an edible image-substrate coating and an edible image can be formed. This includes planar and non-planar surfaces. In addition, the chocolate base layer may constitute the chocolate confectionery of this invention either alone, e.g., a bar of chocolate, or as a component of a chocolate confectionery, e.g., a chocolate enrobed confectionery. Most preferably, the chocolate base layer is a bar of chocolate having a surface that is a substantially planar surface for image formation. The bar of chocolate may take any desired shape, e.g., rectangular, square or circular. The chocolate base layer taking the form of a chocolate bar is preferably molded to the desired shape. The molded chocolate bar may also include molded design features as desired. For example a chocolate bar may be molded so as to include a raised ridge along the perimeter of the chocolate bar to form a chocolate frame. Another example, would be the incorporation of molded decorative areas disposed around or near the substantially planar region for printing.

Figure 2:
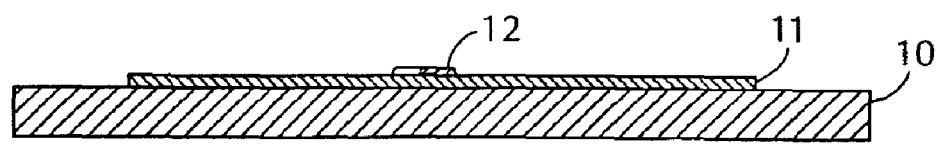
FIG. 2 is a cross-sectional magnified view of the chocolate confectionery of FIG. 1 along line 2A–2B.

FIG. 2 illustrates a magnified cross-sectional view of the milk or dark chocolate confectionery shown in FIG. 1 along line 2A–2B. An edible image-substrate coating 11 is disposed on a portion of the top surface of chocolate base layer 10. The image 12 formed from at least one edible black or colored ink is disposed on the print substrate coating 11.

The edible image-substrate coating 11 may cover the entire surface of the chocolate base layer or only a portion of the surface of the base layer. The edible image-substrate coating 11 typically will substantially cover at least that area on the chocolate base layer that will be defined by the printed image. Moreover, the edible image-substrate coating is a substantially white or light colored coating. The edible-image substrate coating provides sufficient opacity to block out the color of the underlying chocolate base layer.

Generally, the substantially white or light colored edible image-substrate coating is comprised of at least one of a binding agent, a food grade white pigment, a sugar or mixtures thereof. Preferably, the binding agent is one or more starches. Exemplary binding agents include starches, cellulose, gum arabic, dextrin and the like. Exemplary starches include corn starch, rice starch, wheat starch and the like. Exemplary sugars include sucrose, dextrose, fructose and the like. A preferred food grade white pigment is titanium dioxide. An alternative to titanium dioxide is calcium carbonate. Most preferably, the edible image-substrate coating is a mixture of starch and titanium dioxide. Preferred mixtures of binding agent and titanium dioxide generally have a weight ratio of titanium dioxide to binding agent in a range of from about 2.2:1 to about 0.9:1, preferably about 1.7:1 to 1:1 and more preferably about 1.4:1 to 1.1:1.

It has also been found that the inclusion of corn syrup in the image-substrate coating results in a glossy substrate coating and that the surface characteristics of the coating can be altered by adjusting the amount of corn syrup added to the coating solution. Corn syrup may be added directly or may be incorporated by the addition of corn syrup containing glazes. An exemplary corn syrup containing glaze that may be used in the coating solution includes water based glazes such as the commercially available Capol 140, Capol 120, Capol 153D, Capol 149 products available from Centerchem Foods, Stamford, Conn.

For dark or milk chocolate the edible image-substrate coating serves to provide a contrasting background that allows for the formation of highly defined black or colored images on the chocolate confectionary. As noted above, to achieve this contrasting background the substrate coating is generally formulated to be substantially white or lightly colored and provides sufficient opacity to block out the color of the underlying dark or milk chocolate. The variety of light colored image-substrate backgrounds that may be used will be dependent on the ultimate image to be printed and will be readily apparent to those skilled in the art. As used herein "substantially white" includes the variety of color tones known as off-whites.

In another embodiment of the invention the edible image-substrate coating has a feathered edge, i.e., an edge area defining the perimeter of the coating is less dense then the inner area of the coating. More particularly, the dots per unit area at the perimeter edge of the substrate coating is gradually reduced as the edge of the substrate coating is approached from an interior direction until the coating ends. A feathered edge area having a width of about 0.3 cm to about 0.7 cm may be generally employed, although wider and narrower feathered edges may be used as desired. The use of an edible image-substrate coating having a feathered edge advantageously reduces the sharp edge of the substrate coating. It may also be preferable to round the corners of the substrate coating to assist in reducing the sharp edge of the substrate coating.

If the chocolate base layer is white chocolate, the edible image-substrate coating is used to enhance the contrasting background upon which the high resolution edible black or colored image will be printed. An edible image-substrate coating solution that could be used for this purpose is the edible, ink-jettable composition disclosed in copending U.S. patent application Ser. No. 09/587,108, filed Jun. 2, 2000, the entire disclosure of which is incorporated by reference herein.

The high resolution image formed on the edible image-substrate coating is comprised of at least one colored or black food grade ink. Such inks are readily available and are composed of one or more food grade dyes. Generally, the image will be comprised of a plurality of edible food grade inks. Typically, the edible food grade inks will include cyan, magenta, yellow and black inks. The high resolution image is preferably formed using ink jet printing, most preferably a drop on demand ink jet printer. Preferably, the image has a resolution of at least 200 dots per square inch (dpi), more preferably a range of about 300 dpi to about 1200 dpi.

The edible image may be formed on a portion of the edible image-substrate coating or, if desired, may be formed on substantially all of the edible image-substrate coating. In the latter case, the edible image-substrate coating may be applied to form the silhouette of the ultimate black and/or colored image to be formed in the chocolate confectionary.

It may be preferable to round the corners of the printed image to reduce the sharpness of the edge of the image. In a preferred embodiment of the invention the printed image encompasses the entire area of a feathered edible image-substrate coating. It has been found that printing the image to correspond to the perimeter of the feathered edible image-substrate coating results in an image that provides an impression of particularly vibrant colors on the chocolate base layer. In a particularly preferred embodiment, an edible printed image having a feathered or faded edge is superimposed over an edible image-substrate having a feathered edge.

Yet another embodiment of this invention is directed to a method of preparing the chocolate confectionery of this invention. The method comprises the steps of coating at least a portion of a surface of a chocolate base layer with an edible image-substrate coating and forming a colored or black high resolution image on at least a portion of the edible image-substrate coating by the deposition thereon of at least one of an edible black or color ink.

Preferably, the edible image-substrate coating is applied to the chocolate base layer by spraying or roller coating an edible image-substrate coating solution onto the chocolate base layer. If desired, the edible image-substrate may also be applied by ink jet deposition or pad printing. The edible image-substrate coating solution is generally comprised of (i) an image-substrate component selected from the group consisting of at least one of a binding agent, a food grade white pigment, sugar or a mixture thereof and (ii) an evaporable food grade solvent. The preferred substrate component is a mixture of binding agent and titanium dioxide. Typically, the solution will contain about 40 to about 90 percent by weight, preferably about 55 to about 70 percent by weight and most preferably about 58 to about 62 percent by weight of the image-substrate component(s). The evaporable solvent is typically a lower alcohol or a mixture of water and lower alcohol or water alone. Preferably the evaporable solvent is a mixture of water and lower alcohol in a weight ratio of about 5:1 to about 1:1 preferably about 3.5:1 to about 1.5:1 and most preferably about 2.2:1 to about 1.8:1. The preferred lower alcohol is ethanol or isopropyl alcohol, with ethanol being most preferred.

A preservative may also be included in the edible image-substrate coating solution. Exemplary preservatives includes potassium sorbate and citric acid. Preferably, if the evaporable solvent is water alone then a preservative is included.

Other optional ingredients that may be included in the edible image-substrate coating solution include maltodextrin, isomalt and corn syrup solids. It may also be preferable to include an antifoaming agent, particularly when the image-substrate coating solution is applied by spraying.

As noted previously, the solution may be applied by techniques such as spraying, roller coating, pad coating, air brushing or the like. When applying the edible image-substrate coating solution to the chocolate base layer various techniques may be used to obtain the desired coverage. For example, either precise spraying can be used or a mask may be employed on the chocolate base layer. Of course, if desired the full surface of the chocolate base layer may be coated.

Figure 3:
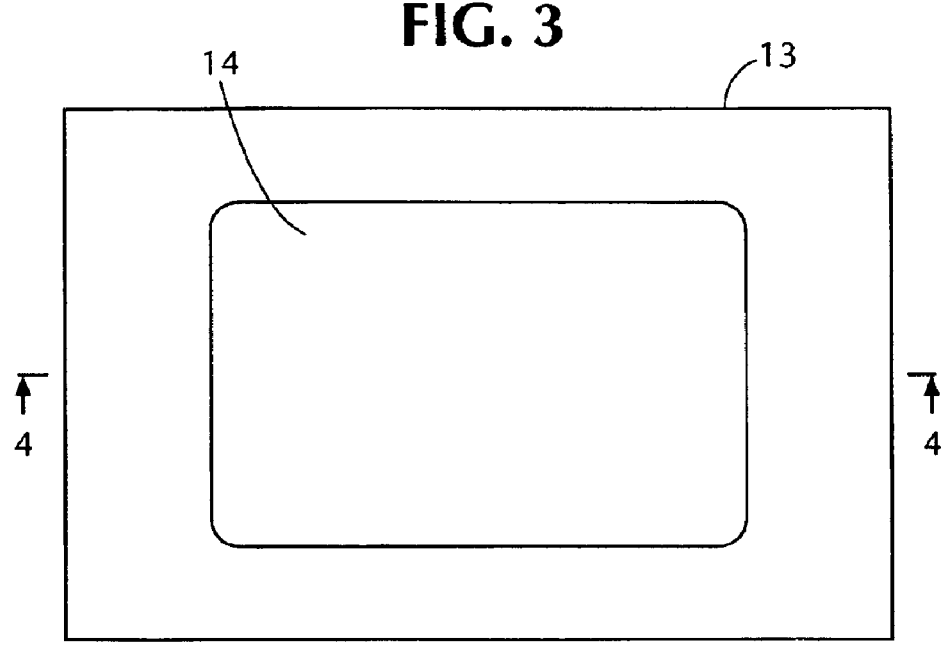
FIG. 3 is a top view of a template on a chocolate bar used to create a feathered edible image-substrate coating.

As previously indicated, a preferred embodiment of this invention encompasses an edible image-substrate coating having a feathered edge. This feathered edge may be achieved using a template 13 such as shown in FIG. 3. The template 13 has an opening 14 that substantially corresponds to the desired area for the edible image-substrate coating on the chocolate base area.

Figure 4:
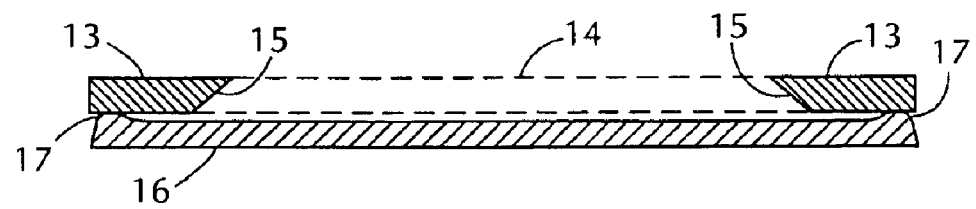
FIG. 4 is a cross-sectional view of the template and chocolate bar of FIG. 3 along line 4A–4B.

Significantly, as shown in FIG. 4, the walls 15 of the opening 14 are angulated so that the area of the opening nearest to the chocolate base layer is greater than the area of the opening on the opposing surface of the template 14. The angle of the wall 15 to the chocolate base layer 16 may be varied as desired, but typically will be about 30 to about 60 degrees. The thickness of the template may also be adjusted, but generally will be in a range of about 0.5 cm to about 2 cm. It should be apparent that varying the wall angle as well as the template thickness will affect the feathered edge achieved when applying the edible image-substrate coating by spraying on to the chocolate base layer.

The template may be placed directly on the surface of the chocolate for application of the coating or, if desired, a gap, e.g., 0.1 cm, may be maintained between the template and the chocolate surface being coated. Such a gap may also be maintained by raised ridges 17 that are a part of the chocolate base layer 16 as illustrated in FIG. 4. It is further noted that the corners of an opening area defining a rectangular area may be rounded on the template to achieve a substrate having rounded corners. In fact, it should be apparent that the opening in the template may take any shape desired including that of the final colored printed image.

A feathered edge may also be achieved by applying the edible image-substrate coating by ink jet printing and instructing the printer via a computer to print fewer dots per unit area at the perimeter edge of the image-substrate being formed than at the non-perimeter edge area. For example, the vignette tool of the "Adobe Photoshop" program available from Adobe, Inc., San Jose, Calif., may be used to ink jet print a feathered edge. It is also possible to create a feathered edge using pad printing.

It should be apparent that, if desired, more than one edible image-substrate coating may be applied to different areas of a single chocolate base layer. This may be particularly desirable where multiple color or black images are being applied to the chocolate base layer.

It is desirable to provide an edible image-substrate coating that is as thin as possible while providing the necessary contrasting background for printing with colored or black edible inks. If the coating is too thick, e.g., 0.21 mm or thicker, the coating will look laminated and may not break cleanly with the chocolate base layer. Generally the image-substrate coating will have a thickness in a range of about 0.01 mm to about 0.2 mm, preferably about 0.02 mm to about 0.15 mm, more preferably about 0.03 mm to about 0.1 mm, and most preferably 0.04 mm to 0.08 mm.

It also may be preferable to prepare the surface of the chocolate base layer prior to application of the edible image-substrate coating by applying a coating that enhances the adherence of the substrate coating to the chocolate base layer. For example, water-based glazes containing gums and/or corn syrups and/or oils, and/or acids and/or sugars and/or starches and/or low-carbon alcohols and/or shellacs and other resins may provide sufficient chocolate surface modification to improve the adherence of the substrate to the chocolate base layer. Solvent based glazes may also be useful. Commercial names of exemplary water-based glazes include, without limitation, commercially available Capol 140, Capol 120, Capol 153D, Capol 149 products, available from Centerchem Foods, Stamford, Conn.

The surface of the chocolate base layer may also be modified with surfactants prior to coating with the edible image-substrate coating solution. An example of a surfactant than can improve the compatibility of the image-substrate with a chocolate surface is Atsurf 456K available from Uniqema, Brantford, Ontario, Canada.

Another embodiment of the invention involves the application of more than one surface pre-treatment layer prior to coating with the substrate. For example, the surface of the chocolate base layer could receive a first pre-treatment application of a surfactant, such as Atsurf 456K, followed by a second application of Capol. Preferably, the Atsurf 456K is applied by spraying followed by brushing with a soft plastic brush to provide a smooth highly compatible surface for application of the next coating, e.g., a corn syrup water-based glaze or the edible image-substrate coating.

The edible image-substrate solution is allowed to dry after application to the chocolate base layer to form the edible image-substrate coating. The drying may take place under ambient conditions or be aided by passing warm dry air over the chocolate base layer. Of course, the temperature of the air must be maintained below a temperature that would be detrimental to the chocolate base layer. While it might be possible to apply the edible image-substrate coating by using a preformed starch based film, such as rice paper, and attach the film to the chocolate base layer with an edible glue, this technique has been found to be inadequate and the results are generally undesirable and would be commercially unacceptable. In particular, the resulting chocolate confectionery does not always break evenly because the edible image-substrate coating and the chocolate base layer are not integrally joined, but instead are laminated. Advantageously, the use of a coating solution overcomes this problem and results in two layers that are integrally joined. This technique, i.e., solution coating, results in a chocolate confectionery that breaks cleanly and evenly, i.e., the coating and chocolate base layer do not delaminate when the chocolate confection is snapped or bitten. Moreover, a person eating the chocolate does not notice a difference in taste or texture resulting from the edible image-substrate coating used in this invention. Obviously, the edible image-substrate coating may be applied by either a single application of the solution or multiple applications of the solution.

After the edible image-substrate coating has been formed, the high resolution print image is formed on the edible image-substrate coating by known printing techniques using food grade black and/or colored inks. As noted, previously, such inks are readily available. While the image may be formed, for example, by pad printing, this technique is limited due to lack of flexibility in changing the image.

Preferably, the high resolution image is deposited using ink jet printing, most preferably drop on demand ink jet printing. Ink jet print heads or print engines that may be used for this task are easily adapted from commercially available ink jet printers. Such printers can be readily modified to allow relatively thick bars of chocolate to pass under the print head. The resulting black or colored image typically has a resolution of at least 200 dpi, and preferably in a range of about 300 dpi to about 1200 dpi.

It should be noted that the image to be printed, i.e., either a black image or a colored image, using ink jet printing can be derived from any digital source, e.g., a computer harddrive, scanner, digital camera or over the internet. Systems for providing digital images to ink jet systems are described, for example, in copending U.S. patent application Ser. No. 09/587,108, filed Jun. 2, 2000, the entire disclosure of which is incorporated by reference herein. As previously noted, it is also possible to fade or feather the image at the edges thereof using available computer image-processing software, if desired. Such feathered edges may also be achieved in the colored or black image using pad printing techniques. It has been found to be most preferable to combine an image having a feathered edge over an edible image-substrate coating having a feathered edge where both the image and the substrate coating have substantially the same dimensions.

The method of printing described herein may be performed in a customizable process in which digital image information is selected by individual consumers and processed to form processed digital image information which is then used to print a high resolution color or black image on the edible image-substrate coating. Such customizable processing, including the use of the Internet in such processing, is more fully described in copending U.S. patent application Ser. No. 09/587,108. It should be apparent that any of the image processing methods described therein would be applicable using the method of printing a colored or black high resolution edible image on a surface of a chocolate confectionery as described herein.

It should be apparent that the above-described techniques may also be employed to obtain a non-chocolate confectionery having a high resolution printed color or black image on a dark colored surface of the confectionery. Accordingly, yet another embodiment of this invention is directed to a non-chocolate confectionery having a high resolution printed image on a surface thereof, said non-chocolate confectionery comprising a sugared base layer having a dark colored surface, an integral substantially white or light colored edible image-substrate coating disposed on at least a portion of said dark colored surface of said base layer and said printed image formed by the deposition of at least one of an edible black or color ink on at least a portion of the image substrate coating. As used herein, dark colored surfaces are those that do not provide a good contrasting background for a colored or black image. Exemplary non-chocolate confectionery having a dark colored surface would include brown or black lollipops and licorice. Of course other sugar based non-chocolate confectionery having a brown or black colored surface are contemplated in this embodiment of the invention.

In yet another embodiment of the invention, a chocolate confectionery having a colored high resolution edible image may be prepared by first applying a colored contrasting image-substrate coating to a chocolate base layer followed by printing an image with a white dye. Generally, the colored contrasting image-substrate coating will be formed from a colored pigmented ink, e.g., a preparation of a Lake or a colored dye in combination with titanium dioxide, which may be applied by roller, spraying, ink jet printing or conventional printing techniques, e.g., pad printing. The contrasting image-substrate coating will typically be a relatively dark colored food dye, e.g., blue, green or red. Printing with an edible white pigment, such as titanium dioxide, over the contrasting substrate results in a chocolate confectionery having an excellent high resolution image. Printing may also be accomplished in this embodiment using any light colored or contrasting ink. The chocolate confectionery produced by the above-described process is yet another embodiment of this invention.

The examples which follow are intended as an illustration of a preferred embodiment of the invention and no limitation of the invention is implied.

EXAMPLE 1

An edible image-substrate coating solution was prepared with the following components:

| | |
|---|---|
| $TiO_2$ dispersion in a saturated aqueous sucrose solution | 100 g |
| Corn Syrup (43 DE; 80% solids) | 37 g |
| Water | 32 g |
| Molding Starch (corn starch) | 23 g |
| Gum Arabic | 5 g |
| Ethanol | 25 g |
| Total | 222 g |

The coating solution was prepared as follows. First, a dispersion was prepared by dispersing $TiO_2$ powder (25% wt.) into a saturated aqueous sucrose solution (75% wt. of a solution of 65–67% wt. sucrose in water) with a high speed mixer. The corn syrup, water and ethanol were added to the dispersion. This was followed by the very slow hand addition of the starch and gum arabic so as to avoid clumping and obtain an even dispersion. The resulting dispersion was then mixed for 20 seconds with a high shear mixer. The resulting coating solution was loaded into a commercial air brush system and sprayed onto a 10 cm×15.2 cm chocolate bar in an area of about 7 cm×11 cm. The coated solution was air dried for about 30 minutes and this resulted in an image-substrate having an average thickness of about 0.08 mm. A digital colored image was sent to a Canon BJC-6000 ink jet printer which had been modified to allow chocolate bars to pass under the print head and an image was printed on the coated chocolate bar. The printer contained print cartridges containing black, cyan, magenta and yellow edible dyes. The resulting ink jet printed image on the coated chocolate bar was of high resolution quality. A sensory evaluation was performed on the resulting chocolate bar and the results are set forth in Table 1.

EXAMPLE 2

A chocolate bar having a printed color image was prepared in a manner similar to Example 1, with the exception that the substrate coating solution was air brushed onto the chocolate bar through a 0.6 cm thick template having a 10.2 cm×6.3 cm opening with angulated walls similar to those illustrated in FIG. 4 to create a feathered edge image-substrate. A sensory evaluation was performed on the resulting chocolate bar and the results are set forth in Table 1.

Comparative Example 1

A digital colored image was printed directly on a milk chocolate using the ink jet printer described in Example 1.

A sensory evaluation was performed on the resulting chocolate bar and the results are set forth in Table 1.

Comparative Example 2

A digital colored image was printed directly on white chocolate using the ink jet printer described in Example 1. A sensory evaluation was performed on the resulting chocolate bar and the results are set forth in Table 1.

Comparative Example 3

A digital colored image was printed directly on rice paper glued to a chocolate tablet using the ink jet printer described in Example 1. A sensory evaluation was performed on the resulting chocolate bar and the results are set forth in Table 1.

TABLE 1

| | Description | Sensory Evaluation |
|---|---|---|
| Comparative Example 1 | Printing Colored Image Directly Onto Chocolate | Very Poor Image Contrast Poor Image Resolution Image Lost on Surface Good Eating Quality |
| Comparative Example 2 | Printing Colored Image Onto White Chocolate | Moderate Image Contrast Poor Image Resolution Old appearance Good Eating Quality |
| Example 1 | Printing Colored Image on White Substrate On Milk Chocolate | Excellent Image Contrast Edge of Image Substrate Noticeable Good Eating Quality |
| Comparative Example 3 | Printing Colored Image on Rice Paper Glued to Chocolate | Excellent Image Contrast Objectional Laminated Appearance Poor Eating Quality |
| Example 2 | Printing Colored Image on White Substrate with Feathered Edge on Milk Chocolate | Excellent Image Contrast Edge of Image Substrate Much Less Noticeable Good Eating Quality |

Other variations and modifications of this invention will be obvious to those skilled in the art. This invention is not limited except as set forth in the following claims.

What is claimed is:

1. A chocolate confectionery comprising:
   a chocolate base layer,
   an integral non-delaminating substantially white or light colored edible image-substrate coating having a thickness in a range of about 0.01 mm to about 0.2 mm disposed on at least a portion of a surface of said base layer such that the substrate coating provides sufficient opacity to block out the color of the underlying chocolate base layer, the substrate coating does not substantially alter the taste and texture of the chocolate base layer and the substrate coating results in a chocolate confectionary that breaks cleanly and evenly, and
   a high resolution printed image formed by the deposition of at least one of an edible black or color ink on at least a portion of said image-substrate coating,
   wherein the image-substrate coating provides a contrasting background for the edible black or color ink to form the high resolution printed image on the chocolate base layer.

2. The chocolate confectionery according to claim 1, wherein said chocolate base layer is milk chocolate or dark chocolate.

3. The chocolate confectionery according to claim 2, wherein said printed image is formed by ink jet printing.

4. The chocolate confectionery according to claim 3, wherein said printed image has a resolution of at least 200 dpi.

5. The chocolate confectionery according to claim 3, wherein said printed image is comprised of a plurality of edible inks.

6. The chocolate confectionery according to claim 2, wherein said edible image-substrate coating is comprised of at least one of a binding agent, a food grade white pigment, sugar or a mixture thereof.

7. The chocolate confectionery according to claim 6, wherein said food grade white pigment is titantium dioxide.

8. The chocolate confectionery according to claim 6, wherein said binding agent is selected from the group consisting of starch, cellulose, gum arabic, dextrin or mixtures thereof.

9. The chocolate confectionery according to claim 8, wherein said starch is selected from the group consisting of corn starch, rice starch, wheat starch and mixtures thereof.

10. The chocolate confectionery according to claim 1, wherein said edible image-substrate coating further comprises corn syrup.

11. The chocolate confectionery according to claim 1, wherein said edible image-substrate coating has a feathered perimeter edge.

12. The chocolate confectionery according to claim 11, wherein said printed image has a feathered perimeter edge.

13. The chocolate confectionery according to claim 12, wherein said printed image has an area that substantially corresponds to an area of said edible image-substrate coating and is superimposed thereon.

14. The chocolate confectionery according to claim 1, wherein said printed image has a feathered perimeter edge.

15. The chocolate confectionery according to claim 1, wherein the chocolate base layer is white chocolate and said printed image is formed by ink jet printing and said edible image-substrate coating comprises a food grade white pigment.

16. The chocolate confectionery according to claim 15, wherein said food grade white pigment is titantium dioxide.

17. The chocolate confectionery of claim 1, further comprising a coating of a water-based glaze or a solvent-based glaze, applied prior to the image-substrate coating in an amount effective to enhance the adherence of the image-substrate coating with the chocolate base layer.

18. The chocolate confectionery of claim 17, wherein said pre-coating includes a water-based glaze containing at least one of a gum, a corn syrup, an oil, a starch, a low carbon alcohol or a shellac.

19. The chocolate confectionery of claim 1, further comprising a pretreatment layer of surfactant applied prior to the image-substrate coating in an amount effective to improve the compatibility of the image-substrate coating with the chocolate surface.

20. The chocolate confectionery of claim 19, further comprising a coating of water-based glaze or solvent based glaze applied after the pretreatment layer of surfactant and prior to the image-substrate coating.

21. A method for printing a colored or black high resolution edible image on a surface of a chocolate confectionery comprising the steps of:
   (a) coating at least a portion of a surface of a chocolate base layer with an integral non-delaminating substantially white or light colored edible image-substrate coating having a thickness in a range of about 0.01 mm to about 0.2 mm such that the substrate coating provides sufficient opacity to block out the color of the underlying chocolate base layer, the substrate coating does not substantially alter the taste and texture of the chocolate base layer and the substrate coating results in a chocolate confectionary that breaks cleanly and evenly; and (b) printing said colored or black high resolution image on at least a portion of said edible image-substrate coating by the deposition thereon of at least one of an edible black or colored ink, such that the image-substrate coating provides a contrasting background for the edible black or color ink to form the high resolution printed image on the chocolate base layer.

22. The method according to claim 21, wherein said chocolate base layer is milk chocolate or dark chocolate.

23. The method according to claim 22, wherein said at least one edible black or colored ink is deposited by ink jet printing.

24. The method according to claim 21, wherein said edible image-substrate coating is applied by spraying, pad printing, ink jet printing or roller coating.

25. The method according to claim 21, wherein said edible image-substrate coating is comprised of at least one of a binding agent, a food grade white pigment, sugar or a mixture thereof.

26. The method according to claim 25, wherein said food grade white pigment is titanium dioxide.

27. The method according to claim 21, wherein said printed image is comprised of a plurality of edible inks.

28. The method according to claim 21, wherein said high resolution image is deposited on a portion of said edible image-substrate coating.

29. The method according to claim 21, wherein said edible image-substrate coating is applied in a manner that forms an edible image-substrate coating having a feathered perimeter edge.

30. The method according to claim 29, wherein said feathered perimeter edge is formed by applying said edible image-substrate coating through a template having an opening area with angular walls defining an area of said edible image-substrate coating on which said feathered edible image-substrate coating is formed.

31. The method according to claim 29, wherein said high resolution image is deposited on substantially all of said edible image-substrate coating.

32. The method according to claim 31, wherein said high resolution image deposited on said edible image-substrate coating has a feathered perimeter edge.

33. The method of claim 21, further comprising, prior to the step of coating the chocolate base layer with the image-substrate coating, the step of applying a pre-coating of a water-based glaze or a solvent-based glaze in an amount effective to enhance the adherence of the image-substrate coating with the chocolate base layer.

34. The method of claim 33, comprising the step of including in said water-based glaze at least one of a gum, a corn syrup, an oil, a starch, a low carbon alcohol or a shellac.

35. The method of claim 21, further comprising, prior to the step of coating the chocolate base layer with the image-substrate coating, a step of pre-treating the chocolate base layer with a surfactant in an amount effective to improve the compatibility of the image-substrate with the chocolate base layer.

36. The method of claim 35 further comprising, subsequent to the step of applying a surfactant, applying a coating of water-based glaze or solvent based glaze, in an amount effective to improve the compatibility of the image-substrate with the chocolate base layer.

* * * * *

UNITED STATES PATENT AND TRADEMARK OFFICE
CERTIFICATE OF CORRECTION

PATENT NO. : 6,893,671 B2
DATED : May 17, 2005
INVENTOR(S) : Eyal M. Ben-Yoseph et al.

It is certified that error appears in the above-identified patent and that said Letters Patent is hereby corrected as shown below:

Title page,
Item [56], References Cited, FOREIGN PATENT DOCUMENTS,
"WO9717409" should read -- 97/17409 --; and
"057717" should read -- 00/57717 --.

Column 12,
Line 28, "claim 35" should read -- claim 35, --; and
Line 30, "solvent based" should read -- solvent-based --.

Column 4,
Line 20, "confectionary." should read -- confectionery. --.

Column 7,
Line 12, "harddrive," should read -- hard drive, --; "internet" should read -- Internet. --; and
Line 67, "Lake" should read -- lake --.

Column 10,
Line 55, "solvent based" should read -- solvent-based --.

Signed and Sealed this

Fourteenth Day of February, 2006

JON W. DUDAS
*Director of the United States Patent and Trademark Office*